A. ROTH.
Blast Furnace.
No. 214. Reissued April 6, 1852.
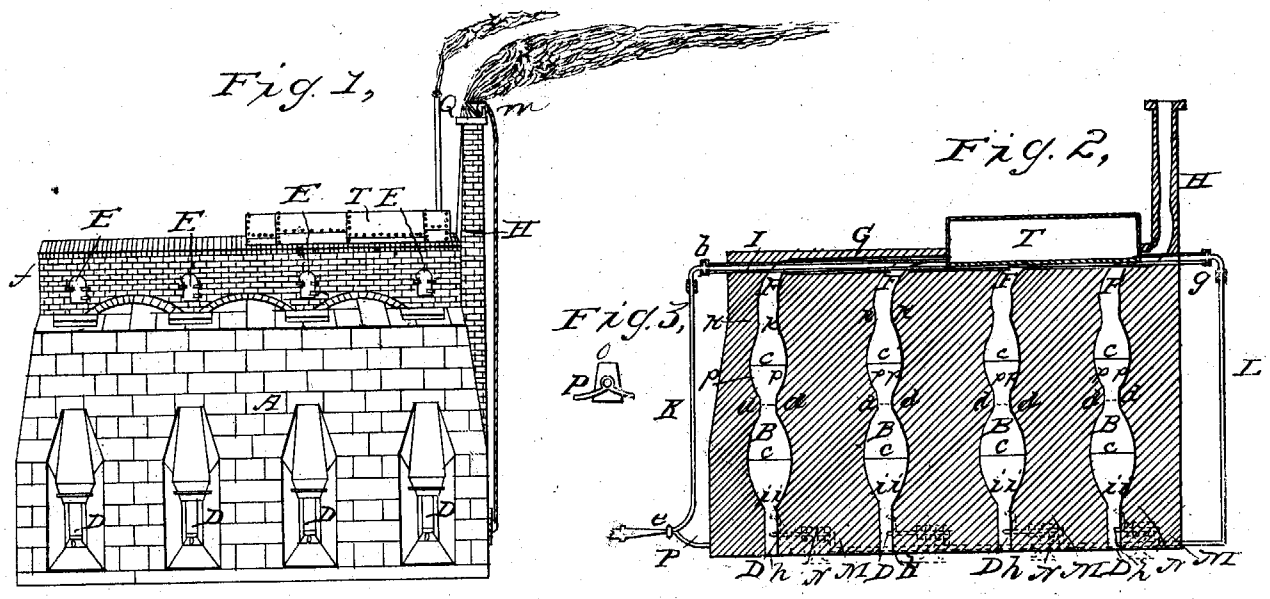
N. PETERS, Photo-Lithographer, Washington, D. C.

UNITED STATES PATENT OFFICE.

I. AUGUSTUS ROTH, OF PHILADELPHIA, PENNSYLVANIA.

IMPROVEMENT IN THE CONSTRUCTION OF FURNACES FOR SMELTING IRON ORES.

Specification forming part of Letters Patent No. 1,396, dated October 31, 1839; Reissue No. 214, dated April 6, 1852.

*To all whom it may concern:*

Be it known that I, I. AUGUSTUS ROTH, formerly of Pottsville, and now of Philadelphia, and county of Philadelphia and State of Pennsylvania, have invented a new and useful Improvement in Furnaces for Smelting Ores and Metals, called Roth's Combination Furnace; and I do hereby declare that the following is a clear and exact description thereof, reference being had to the annexed drawings of the same, with letters marked thereon, making part of this specification.

The nature of this invention and improvement consists in a certain new and useful arrangement of several furnaces in connection with one horizontal flue, by which a new and beneficial effect is produced, in increasing the draft of the furnaces by conveying the several branch flues from the same into one long horizontal flue extending from the furnace to the chimney. A boiler is placed in said horizontal flue for creating steam by the waste heat of the furnaces, sufficient to work an engine for making the blast of the furnaces, which is first driven by said engine through pipes placed in the before-mentioned extended flue, where it is heated, and then through pipes leading through reservoirs of cold water, where the temperature of the same is regulated previous to passing through the tuyeres to the crucibles of the furnaces.

To enable others skilled in the art of making furnaces to make and construct one on my plan, I will proceed to describe the mode of constructing and operating one containing four fire-rooms in one stack of masonry.

Figure I in the annexed drawings is a perspective front view of the four furnaces combined, the draft regulating door or damper being open, the charging-doors being shut, the furnaces in operation, and the boiler generating steam for an engine. Fig. II is a vertical longitudinal section of said furnaces through the center thereof, showing the interior of the same. Fig. III is a sectional view of one of the tuyeres, showing the pipes for conveying cold water or cold air around the same.

Similar letters refer to similar parts in the several figures.

To illustrate my invention and improvement I will here describe a combination of four furnaces, it being, however, understood that the number of furnaces may be increased or diminished, as may be deemed expedient. The furnaces are all contained in a body of masonry called a "stack," (marked A,) of any required length, breadth, and thickness. In this masonry are constructed the crucibles D, which are made of any required length, breadth, and depth, rising from the hearths *h* to the lower parts of the boshes at *i i*. The fire-chambers B resemble in these drawings two truncated ovals placed endwise together, or one truncated oval contracted toward its center, as at *d d*. They may, however, be constructed in any other form or shape, their height extending from *i i* to E. The branch flues from the several furnaces, $F^1$ $F^2$ $F^3$ $F^4$, divide from the straight lines of the fire-chambers, as at *k k*, and curve as at F, contract and unite with the long horizontal flue G. The long horizontal flue G is a continuation of flues $F^1$ $F^2$ $F^3$ $F^4$ from fire-rooms or fire chambers B, and extending the full length of the furnace-stack to the chimney H. The longest of said flues will of course have the strongest draft, and the dimension of diameter of the furnace should be in proportion to said draft. The furnace having the strongest draft will carry the largest quantity of charges, the other branch flues leading into the horizontal flue G having a tendency to assist each other in increasing the draft by thus leading into said horizontal flue and uniting with each other. Such increased draft is essentially necessary to facilitate the reduction of the materials contained within the furnace and to abstract the volatile mineral substances in gaseous form from the same, to make room for those gases constantly produced in the smelting process below, and so assist the blast in the hearth. The crucibles and in walls are made in the usual manner with fire-proof material. The tuyeres O are inserted at any convenient parts of the crucibles. The boiler T, for generating steam for creating the blast and other purposes is made in the usual manner, and is placed in the horizontal flue G near the chimney H, and is heated by the waste heat passing through said flue. The engine is of ordinary construction, and therefore need not be represented or described. The "furnace-mouths" or "tunnel heads" of the furnaces are surrounded by brick walls, with the exception of the doors E, through which the furnaces are charged, which also serve as valves to assist in regulating the draft, being open to decrease it and shut to increase it. Two parallel tubes, I I, are placed in the before-mentioned long horizontal flue G for conveying air through the same, which air is to be heated during its passage through said flue, and is afterward used to supply the furnace with hot-blast. These tubes are united by a coupling-box, *b*, to a single tube, K, through which the cold air to be heated is forced by the steam-engine, the cold air entering at *e*. The other ends of the parallel tubes I I are united by another coupling-box, *g*, to another single tube, L, which conveys the air, when heated, through the tuyeres to the crucibles of the furnaces. The air, however, before entering the furnaces, is made to pass through branch pipes M, passing through reservoirs N of water, (represented by dotted lines,) for imparting to the air a proper degree of temperature, which reservoirs are kept filled with cold running water supplied by the engine, or from other reservoirs placed above them, or by any other means preferred. The rapid destruction of the tuyeres by the heat in the crucible is prevented in the known application of cold water or cold air forced through branch pipes cast into the tuyeres. Fig. III shows the pipes around one of the tuyeres, which is made of cast-iron and marked O. A door, S, is placed in the wall in front of the steam-boiler for the purpose to have access in to the long horizontal flue G. A hinged door or damper, Q, is placed at the top of the chimney for regulating the draft, and is operated by means of a cord, *l*, and pulley *m* whenever required. The furnaces are charged through the doors E, and the melted metal is drawn off at the bottom of the hearths in the usual manner.

Having described the construction and operation of my improved furnace for smelting ores and metals, I will now state what I claim as my invention and improvement and desire to secure by Letters Patent:

First, I do not claim the increasing of the draft as separately by itself; second, and I do not claim to generate steam or to heat the blast by waste heat otherwise than hereinafter claimed. I therefore only claim as my invention and improvement the arrangement of the fire-chambers opening each by a flue into one horizontal flue, in combination with the boiler placed in said flue for generating steam, and the pipes I I therein as a means of heating the blast, the whole being constructed and operating as described.

I. AUGUSTUS ROTH.

Witnesses:
THOS. K. AMIES,
JOHN A. BASTZ.